United States Patent [19]
Shen

[11] Patent Number: 5,908,815
[45] Date of Patent: Jun. 1, 1999

[54] HEAT RESISTANT GREASE

[75] Inventor: Chih-Chang Shen, Kanagawa, Japan

[73] Assignee: Dow Corning Asia, LTD., Tokyo, Japan

[21] Appl. No.: 08/837,663

[22] Filed: Apr. 22, 1997

Related U.S. Application Data

[63] Continuation of application No. 08/557,880, Nov. 14, 1995, abandoned.

[30] Foreign Application Priority Data

Nov. 17, 1994 [JP] Japan .................................. 6-308121

[51] Int. Cl.$^6$ ................................................. C10M 107/50
[52] U.S. Cl. ......................... 508/206; 508/207; 508/390; 508/509; 508/510; 508/517; 508/550; 508/585
[58] Field of Search ..................................... 508/206, 207, 508/510, 517, 509, 585, 550, 390

[56] References Cited

U.S. PATENT DOCUMENTS

| | | |
|---|---|---|
| 3,314,889 | 4/1967 | Christian . |
| 3,422,014 | 1/1969 | Forbes et al. . |
| 3,642,626 | 2/1972 | Christian . |
| 3,758,549 | 9/1973 | Dexter et al. . |
| 3,814,689 | 6/1974 | Christian ................... 508/206 |
| 4,692,258 | 9/1987 | Rasberger et al. ....................... 508/261 |
| 4,724,092 | 2/1988 | Fukui et al. . |
| 4,840,743 | 6/1989 | Gardiner . |
| 4,842,753 | 6/1989 | Mori et al. . |
| 5,445,751 | 8/1995 | Kanzaki et al. ......................... 508/201 |
| 5,445,752 | 8/1995 | Caporiccio ............................... 508/206 |

FOREIGN PATENT DOCUMENTS

| | | | |
|---|---|---|---|
| 59-25826 | 2/1984 | Japan ................. | C08K 5/15 |
| 67132 | 3/1994 | Japan ........................... | C10M 159/24 |

*Primary Examiner*—Jacqueline V. Howard
*Assistant Examiner*—Cephia D. Toomer
*Attorney, Agent, or Firm*—Larry A. Milco

[57] ABSTRACT

A heat resistant grease composition containing a fluorosilicone base oil, a fluororesin thickener and an additive, that has a reduced gelling, reduced base oil evaporation, and stable heat resistance.

5 Claims, No Drawings

HEAT RESISTANT GREASE

This application is a continuation of application Ser. No. 08/557,880 filed Nov. 14, 1995 which application is now: abandoned.

FIELD OF THE INVENTION

This invention pertains to a heat resistant grease composition, comprising a fluorosilicone oil as a base oil, a fluororesin thickening agent, and an oxidizing agent.

DESCRIPTION OF THE RELATED ART

It is well known that a grease prepared with a fluorosilicone oil as the base oil and a fluororesin as a thickener has a high heat resistance.

In U.S. Pat. No. 3,314,889, issued on Apr. 18, 1967, Christian teaches a grease composition comprising a fluorosilicone base fluid and a powdered fluoroethylene polymer filler that can be used over a wide range of temperatures and under heavy loads.

In U.S. Pat. No. 3,642,626, issued on Feb. 15, 1972, Christian teaches a grease composition comprising a polyfluoroalkyl polysiloxane, a copolymer of perfluoropropylene and tetrafluoroethylene, and antimony dialkyl dithiocarbamate, that can be used over a wide range of temperatures and under heavy loads.

In U.S. Pat. No. 4,724,092. issued on Feb. 9, 1988, Fukui et al. teach a fluorine-containing grease composition comprising a halogen-containing linear polyether, and a fluororesin.

The Christian '889 and '626 patents and the Fukui et al. patent referenced above disclose heat resistant grease compositions. However, over time and at high temperatures, the properties of these conventional greases degrade.

SUMMARY OF THE INVENTION

It is an object of the present invention to provide a fluorine-containing grease composition that does not degrade at high temperatures. It is a further object of this invention to provide a fluorine-containing grease having a heat resistance that-is stable over a long period of time.

More specifically, the purpose of this invention is to prevent evaporation of the base oil from the aforementioned fluorine-containing grease and to prevent gelling or curing of the fluorine-containing grease. In this invention, the heat resistance is defined by the evaporation rate of the base oil and gelling of the grease.

This invention provides a heat resistant grease composition that can reduce the problem of gelling over time at high temperatures and reduce the problem of high evaporation of base oil over time. In particular, this invention provides a heat resistant grease composition appropriate for use in the fan clutch bearings of automobiles.

The heat resistant grease composition of the present invention comprises A) a fluorosilicone base oil, B) a fluororesin thickening agent and C) an additive selected from the group consisting of i. 3,9-bis(1,1-dimethyl-2-($\beta$-(3-t-butyl-4-hydroxy-5-methylphenyl)-propionyloxy)ethyl]-2,4,8,10-tetraoxaspiro(5.5) undecane having the general formula

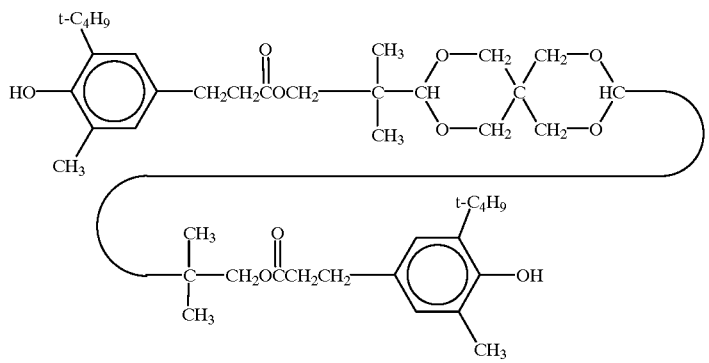

where t—$C_4H_9$ is a tert-butyl group:

ii, compounds having the formula

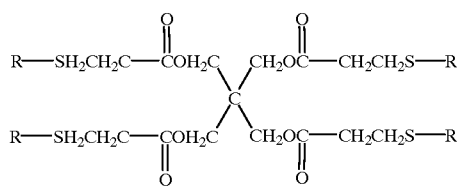

where R is an alkyl group having 12 carbon atoms;

iii. 1,1,3-tris(2-methyl-4-hydroxy-5-t-butylphenyl)butane having the formula

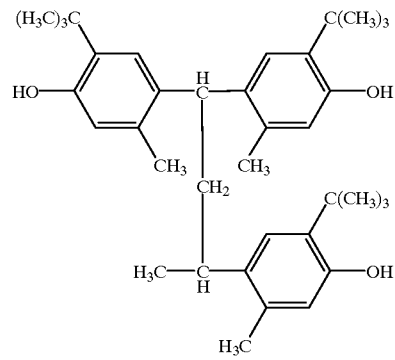

iv. copper phthalocyanine having the formula

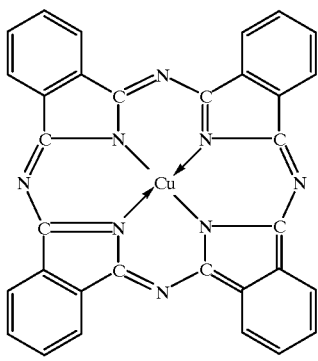

v. calcium sulfonate having the general formula

where $R^1$ is an alkyl group;

vi. copper acetylacetonate:

viii. the compound obtained by heating
   (a) 4-(phenylamino)phenoxydimethylsilyl-terminated dimethylpolysiloxane with
   (b) a mixture of polydimethylsiloxane and zirconium carboxylate, in an inert atmosphere at a temperature sufficient to decompose the zirconium carboxylate, wherein the zirconium carboxylate contains 0.1 to 10 weight percent of zirconium metal; and ix. mixtures thereof.

The grease composition of the present invention has high heat resistance. Unlike conventional greases, the grease composition of the present invention does not exhibit the problems of gelling and base oil evaporating, even over time at high temperatures. The grease composition of the present invention exhibits improved heat resistance. This is because gelling of the grease and the rate of evaporation of the base oil are reduced. When the grease composition of the present invention is exposed to high temperatures over long periods of time, it does not gel and it has a lower rate of evaporation of base oil than conventional heat resistance greases.

The present invention also relates to methods of using the heat resistant grease in an automobile fan clutch apparatus.

INGREDIENT A

Ingredient A is a fluorosilicone oil. It is used as the base oil of the heat resistant grease of the present invention. The fluorosilicone oil is an organopolysiloxane having fluoroaklyl groups or perfluoroalkyl groups.

The viscosity of the fluorosilicone oil used in this invention must be in the range that enables the formation of a grease. In preferred embodiments, the viscosity (at 25° C.) is in the range of 100 to 100,000 centistokes. In more preferred embodiments, the viscosity (at 25° C.) is in the range of 100 to 50,000 centistokes. When the grease of the present invention is to be used in fan clutch bearings, the viscosity (at 25 ° C.) is preferably in the range of 300 to 5,000 centistokes.

The temperature range for use of the fluorosilicone oil of this invention should be in the range of −50° C. to 400° C., or preferably in the range of −30° C. to 300° C.

The fluorosilicone oils that may be used as Ingredient A include, but are not limited to, compounds represented by the following formula

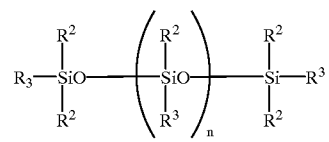

where $R^2$ is a hydrocarbon group containing 1 to 3 carbon atoms, $R^3$ is selected from the group consisting of methyl, ethyl, vinyl, phenyl and—$CH_2CH_2R^4$, where $R^4$ is a perfluoroalkyl group containing 1 to 10 carbon atoms, and n is selected such that the viscosity (at 25° C.) of the compound is in the range of 100–100,000 centistokes. At least 50% of the $R^3$ groups should be—$CH_2CH_2R^4$ groups. The formula above is designated as formula 1.

Among the fluorosilicone compounds represented by formula 1, the following are particularly preferred
   (a) Trifluoropropylmethylpolysiloxanes represented by the general formula

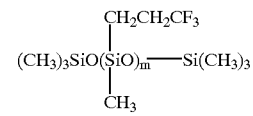

where m is selected such that the viscosity (at 25° C.) of the trifluoropropylmethylpoiysiloxane is in the range of 100 to 100,000 centistokes:
   (b) Perfluoroaikylmethylpolysiloxanes represented by the general formula

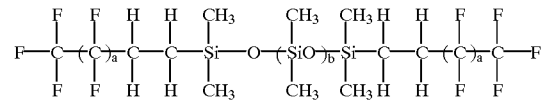

where a and b are numbers selected such that the viscosity (at 25° C.) of the perfluoroalkylmethylpolysiioxane is in the range of 100 to 100,000 centistokes;
   (c) compounds having the general formula

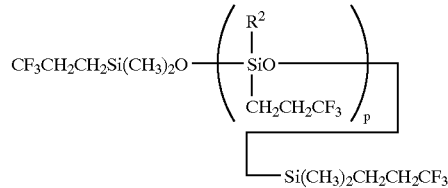

were p is a number selected such that the viscosity (at 25° C.) of the compound in the range of 100 to 100,000 centistokes, and $R^2$ is a hydrocarbon group containing 1 to 3 carbon atoms;
   (d) compounds having the general formula

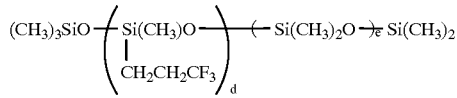

were d and e are numbers selected such that the viscosity (at 25° C.) of the compound is in the range of 100 to 100,000 centistokes;

(e) compounds having the general formula

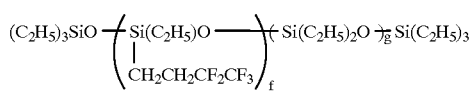

where f and g are numbers selected such that the viscosity (at 25° C.) of the compound is in the range of 100 to 100,000 centistokes;

(f) compounds having the general formula

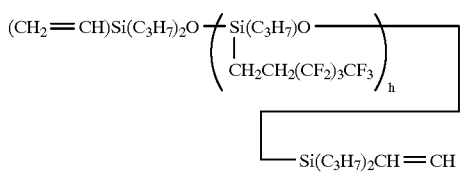

where h is a number selected such that the viscosity (at 25° C.) of the compound is in the range of 100 to 100,000 centistokes;

(g) compounds having the general formula

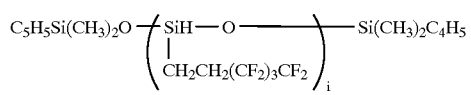

where i is a number selected such that the viscosity (at 25° C.) of the compound is in the range of 100 to 100,000 centistokes; and (h) compounds having the general formula

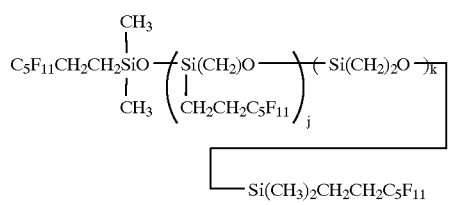

where j and k are numbers selected such that the viscosity (at 25° C.) of the compound is in the range of 100 to 100,000 centistokes.

As long as the purpose of this invention is not hampered, other conventional grease base oils, including, but not limited to, silicones, esters, polyethers, synthetic hydrocarbon oils, mineral oils and vegetable oils, may be added and blended. Examples of silicones that may be added and blended include, but are not limited to, perfluoropolyethers, fluorosilicones, methylphenylsilicones, and dimethylsilicones.

INGREDIENT B

There is no special limitation on the type of the fluororesin thickening agent used as Ingredient B of the heat resistant grease composition of this invention. Examples of the types of fluororesins that may be used as thickening agents in the present invention include, but are not limited to, polytetrafluoroethylene (PTFE), and trifluoroethylene resin.

As long as the purpose of this invention is not hampered, various conventional thickening agents can be added into the aforementioned fluororesin-type thickener. Examples of the conventional thickening agents that can be added include, but are not limited to, lithium soaps, calcium soaps, aluminum soaps, silica, lithium complexes, calcium complexes, aluminum complexes, urea and bentonite.

There is no special limitation on the blending ratio of the fluorosilicone oil to fluororesin thickening agent in the heat resistant grease composition of this invention. The preferred blending ratio depends upon the desired consistency of the heat resistant grease and the temperature at which the grease will be applied. The consistency of the heat resistant grease can be measured according to JIS K2220. In preferred embodiments of the present invention, the consistency of the heat resistant grease, measured according to JIS K2220, is in the range of 1 to 3. When the heat-resistant grease composition is to be used in fan clutch bearings, the consistency is preferably about 2.

INGREDIENT C

Ingredient C is an oxidizing agent. It is an additive selected from the group consisting of i. 3,9-bis(1,1-dimethyl-2-(β-(3-t-butyl-4-hydroxy-5-methylphenyl)-propionyloxy)ethyl)-2,4,8,10-tetraoxaspiro (5.5) undecane having the general formula

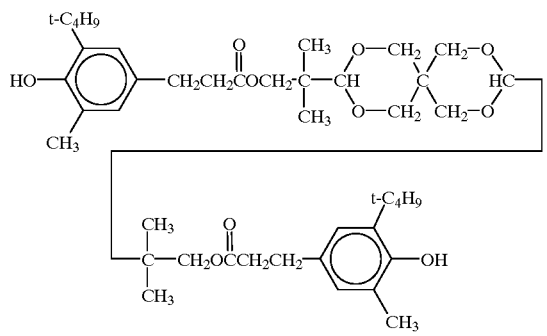

where t-$C_4H_9$ is a tert-butyl group;

ii. compounds having the formula

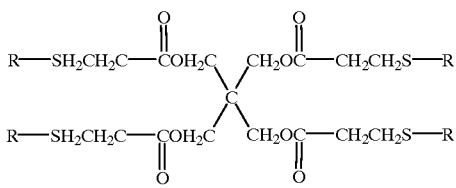

where R is an alkyl group having 12 carbon atoms;

iii. 1,1,3-tris(2-methyl-4-hydroxy-5-t-butylphenyl)butane having the formula

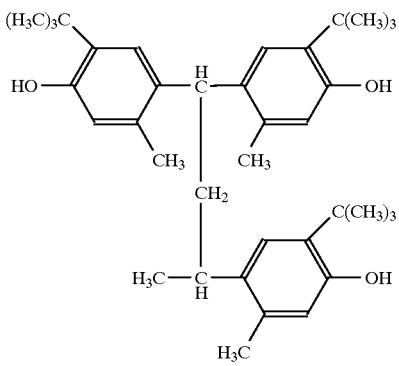

iv. copper phthalocyanine having the formula

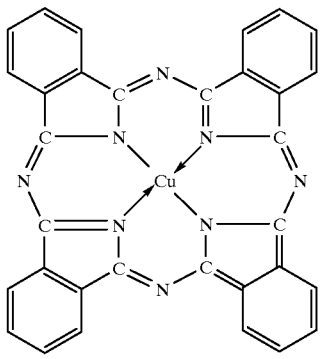

v. calcium sulfonate having the general formula

where $R^1$ is an alkyl group;
vi. copper acetylacetonate;
viii. the compound prepared by heating
  (a) 4-(phenylamino)phenoxydimethylsilyl-terminated dimethylpolysiloxane with
  (b) a mixture of polydimethylsiloxane and zirconium carboxylate, wherein the zirconium carboxylate contains 0.1 to 10 weight percent of zirconium metal, in an inert atmosphere at a temperature sufficient to decompose the zirconium carboxylate; and
ix. mixtures thereof When Ingredient C is a compound as described in viii above, the preferable ratio by weight of the aforementioned ingredients (a) to (b) is in the range of 0.5:1 to 1:0.5. If this range of ratio by weight is not observed, a sufficiently high heat resistance cannot be obtained. The two ingredients may be used as a mixture, or one of them may be added first and the other one added later. The preferable viscosity (at 25° C.) of the aforementioned 4-(phenylamino) phenoxydimethylsilyl-terminated dimethylpolysiloxane is in the range of 50 to 300 centistokes. If this range of viscosity is not observed, the dispersability becomes poor.

The amount of Ingredient C should be in the range of 0.5 to 10 percent by weight with respect to the total amount of the fluorosilicone oil and fluororesin thickening agent. If the amount is less than 0.5 weight percent, a sufficiently high heat resistance cannot be realized. On the other hand, if the amount is larger than 10 weight percent, the properties and appearance of the grease itself will be affected.

The heat-resistant grease composition of this invention may be manufactured using any conventional grease manufacturing method. More specifically, after the base oil, thickener, and additives are well blended in a kneader, the blend is made to pass through a two roll mill.

The heat resistant grease composition of this invention, in addition to the aforementioned fluorosilicone oil, fluororesin thickening agent, and oxidizing agent additive, may also contain one or more of other additives that are commonly added into greases. The list of optional additives that may be added to the heat resistant grease composition of the present invention include, but are not limited to, solid lubricants and extreme pressure lubricants. Examples of solid lubricants that may be used include, but are not limited to, molybdenum disulfide ($MoS_2$) and graphite. Examples of extreme pressure lubricants that may be used include, but are not limited to, zinc dithiophosphate, zinc dithiocarbamate, phosphates, and alkyl sulfides.

EXAMPLES

An evaluation of the heat-resistant grease composition of this invention was undertaken. The evaluation included the preparation of heat resistant greases of the present invention. These greases were designated as application examples. Conventional heat-resistant greases, containing no additives such as are described above as Ingredient C, were also tested. These greases were designated as comparative examples. An evaluation was carried out using the test methods of Experiments 1 and 2 listed below. The results are listed in the following Tables I–XI. After storage for 264 hours at 200° C., the heat resistant grease composition of the present invention had 1) a loss due to evaporation of 16% or less, and (2) maintained its properties and appearance.

Test method of Experiment 1

1) Ten grams of the grease sample was smoothly coated having a diameter of 51 mm and a depth of 16 mm.

2) The grease sample was subjected to aging in an oven at 200° C.

3) After the prescribed time, the grease sample was removed from the oven, allowed to cool at room temperature. The weight of the grease sample was then measured.

Test method of Experiment 2

1) Using 10 grams of the grease sample, the unblended consistency of the grease sample was measured. A ½ consistency tester was used. The unblended consistency was measured according to "JIS K2220-1984, Reference 11:¼ and ½ consistency test method of grease."

2) The grease sample was then subjected to aging using the method described in Experiment 1.

3) The unblended consistency was then measured using a ¼ consistency tester, according to "JIS K2220-1984, Reference 11:¼ and ½ consistency test method of grease."

The following ingredients were used to formulate the greases that were evaluated in Experiments 1 and 2.

1. Ingredient 1-1, Si Oil 500 and ingredient 1-2, Si Oil 300, are represented by the following formula

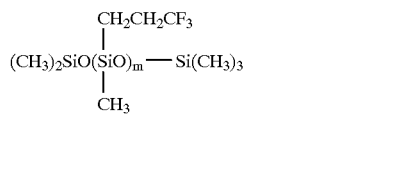

Ingredient 1-1 and ingredient 1-2 have the same basic configuration. In both, the principal chain is made of trifluoropropylmethylsiloxane and the terminal groups are trimethylsilyl groups. Ingredient 1-1 has a viscosity of 500 centistokes, at 25° C. Ingredient 1-2 has a viscosity of 300 centistokes at 25° C.;

2. Ingredient 2: PTFE (polytetrafluoroethylene);
3. Ingredient 3: modified undecane mixture (1:1 mixture of the compound represented by the formula

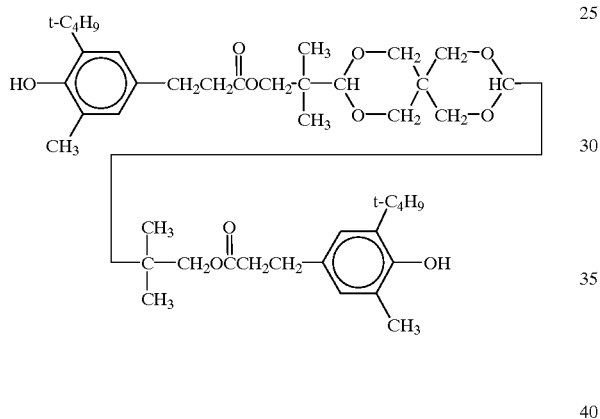

were t—$C_4H_9$ is a tert-butyl group and the compound represented by the formula

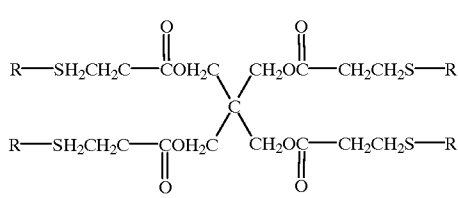

were R is an alkyl group having 12 carbon atoms.

4. Ingredient 4: modified butane (A compound represented by the formula

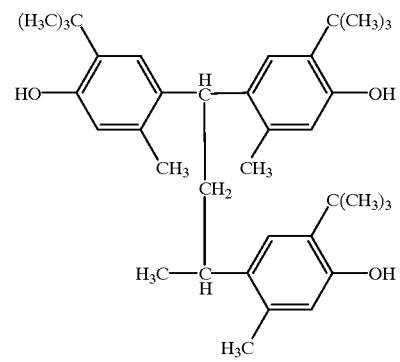

5. Ingredient 5: Cu phthalocyanine (A compound represented by the formula

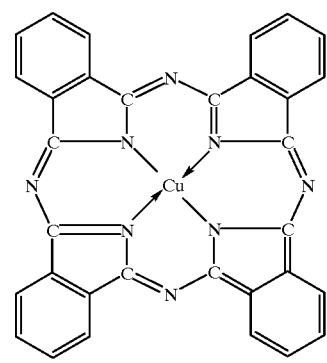

6. Ingredient 6: Ca sulfate (A compound represented by the formula $R^1$—$SO_3Ca$ 7. Ingredient 7: MgO:
8. Ingredient 8: Ca stearate (Calcium stearate);
9. Ingredient 9: AcAcCa (Calcium acetylacetonate sait);
10. Ingredient 10: Ca SANSA (Calcium monostearylamidosebacate);
11. Ingredient 11: Zn SANSA (Zinc monostearylamidosebacate);
12. Ingredient 12: 4-(phenylamino)phenol-terminated dimethylpolysiloxane (A compound represented by the following formula

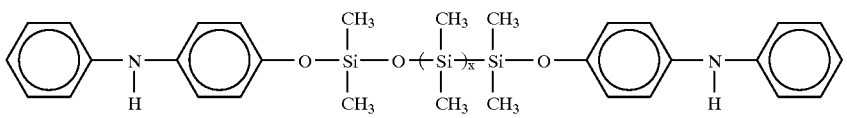

where x is selected such that the viscosity (at 25° C.) of the compound is 100 centistokes;

13. Ingredient 13: The compound prepared by heating a mixture of polydimethylsiloxane and zirconiumoctanoate, having a weight ration of 3:1, in a nitrogen atmosphere for 24 hours at 350 ° C.;
14. Ingredient 14: 1:1 mixture of ingredients 12 and 13
15. Ingredient 15: Ferrocene Fe, which is also known as metallocene Fe, having the formula $Fe(C_5H_5)_2$;

16. Ingredient 16: AcAcCu (Copper acetylacetonate);
17. Ingredient 17: $Ca(OH)_2$;
18. Ingredient 18: PTFE powder (A product of Central Glass Co. The commercial name of the product, translated into English, is Sefralube.); and
19. Ingredient 19: PTFE powder ("FLUON" 171J, which is a product of Asahi Glass Co., Ltd. "FLUON" is a registered trademark of Imperial Chemical Industries, Ltd., of London, England.)

TABLE I

Evaporation Test - Experiment 1
Composition of Application Example Greases

| Ingredient No. | Ingredient Name | Application Example 1 | Application Example 2 | Application Example 3 | Application Example 4 |
|---|---|---|---|---|---|
| 1-1 | Si Oil 500 | 62.5 | 62.5 | 62.5 | 62.5 |
| 2 | PTFE | 37.5 | 37.5 | 37.5 | 37.5 |
| 3 | Modified Undecane Mixture | 1.0 | | | |
| 4 | Modified Butane | | 1.0 | | |
| 5 | Cu Phthalocyanine | | | 1.0 | |
| 6 | Ca Sulfonate | | | | 1.0 |
| 7 | MgO | | | | |
| 8 | Ca Stearate | | | | |
| 9 | AcAc Ca | | | | |
| 10 | Ca SANSA | | | | |
| 11 | Zn SANSA | | | | |

TABLE II

Evaporation Test - Experiment 1
Loss Due to Evaporation (%)/Storage Time (hours)
Results for Application Examples

| Storage Time (Hours) | Application Example 1 | Application Example 2 | Application Example 3 | Application Example 4 |
|---|---|---|---|---|
| 0.0 | 0.0 | 0.0 | 0.0 | 0.0 |
| 24.0 | 3.4 | 2.8 | 2.9 | 3.4 |
| 48.0 | 4.7 | 3.9 | 4.2 | 4.7 |
| 72.0 | 6.1 | 5.0 | 5.4 | 5.8 |
| 96.0 | 6.8 | 5.6 | 6.1 | 6.6 |
| 168.0 | 8.4 | 7.5 | 8.1 | 8.6 |
| 264.0 | 9.5 | 9.0 | 9.5 | 10.4 |
| 384.0 | 12.8 | 10.0 | 10.7 | 13.8 |
| 500.0 | 19.8 | 10.9 | 11.7 | 19.6 |

*Storage temperature: 200° C.; sample amount: 10 g
*In Application Examples 1–4, the grease properties and appearance were maintained after storage for 264 hours.

TABLE III

Evaporation Test - Experiment 1
Composition of Comparative Example Greases

| Ingredient No. | Ingredient Name | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| 1-1 | Si Oil 500 | 62.5 | 62.5 | 62.5 | 62.5 | 62.5 | 62.5 |
| 2 | PTFE | 37.5 | 37.5 | 37.5 | 37.5 | 37.5 | 37.5 |
| 3 | Modified Undecane Mixture | | | | | | |
| 4 | Modified Butane | | | | | | |
| 5 | Cu Phthalocyanine | | | | | | |
| 6 | Ca Sulfonate | | | | | | |
| 7 | MgO | | 1.0 | | | | |
| 8 | Ca Stearate | | | 1.0 | | | |
| 9 | AcAc Ca | | | | 1.0 | | |
| 10 | Ca SANSA | | | | | 1.0 | |
| 11 | Zn SANSA | | | | | | 1.0 |

TABLE IV

Evaporation Test - Experiment 1
Loss Due to Evaporation (%)/Storage Time (Hours)
Results for Comparative Examples

| Storage Time (Hours) | Comp. Ex. 1 | Comp. Ex. 2 | Comp. Ex. 3 | Comp. Ex. 4 | Comp. Ex. 5 | Comp. Ex. 6 |
|---|---|---|---|---|---|---|
| 0.0 | 0.0 | 0.0 | 0.0 | 0.0 | 0.0 | 0.0 |
| 24.0 | 4.5 | 9.1 | 4.1 | 32.7 | 7.6 | 5.2 |
| 48.0 | 6.7 | 11.6 | 6.1 | 37.1 | 10.8 | 7.2 |
| 72.0 | 9.2 | 14.0 | 8.3 | ② | 13.1 | 8.7 |
| 96.0 | 11.0 | 15.8 | 10.3 | — | 15.2 | 9.5 |
| 168.0 | 16.2 | 21.1 | 17.0 | — | 22.0 | 14.4 |
| 264.0 | 20.3 | ① | 21.3 | — | ③ | 21.5 |
| 384.0 | 23.2 | — | 24.2 | — | — | 25.7 |
| 500.0 | 25.9 | — | — | — | — | ④ |

*Storage temperature: 200° C.; sample amount: 10 g
*In ①–④, as the grease properties and appearance were lost and measurement was therefor ceased.

TABLE V

Aging Test - Experiment 1–2
Test Results and Composition of Application Example Greases

| Ingredient No. | Ingredient Name | Application Example 5 | Application Example 6 | Application Example 7 | Application Example 8 |
|---|---|---|---|---|---|
| 1-1 | Si Oil 500 | 61.9 | 61.9 | 61.9 | 61.9 |
| 2 | PTFE | 37.1 | 37.1 | 37.1 | 37.1 |
| 3 | Modified Undecane Mixture | 1.0 | | | |
| 4 | Modified Butane | | 1.0 | | |
| 5 | Cu Phthalocyanine | | | 1.0 | |
| 6 | Ca Sulfonate | | | | 1.0 |
| 7 | MgO | | | | |
| 8 | Ca Stearate | | | | |
| 9 | AcAc Ca | | | | |
| 10 | Ca SANSA | | | | |
| 11 | Zn SANSA | | | | |
| | Before Aging[1] | 275 | 275 | 275 | 275 |
| | After Storage at 200° C. for 500 hours[2] | Grease properties & appearance were maintained but the surface of the grease was slightly gelled. | 240 | 228 | Grease properties & appearance were maintained but the surface of the grease was slightly gelled. |

[1]Grease consistency was measured before aging using ½ consistency tester.
[2]Grease consistency was measured after aging using a ¼ consistency tester.

TABLE VI

Aging Test - Experiment 1-2
Test Results and Composition of Comparative Examples Greases

| Ingred. No. | Ingredient Name | Comparative Example 7 | Comparative Example 8 | Comparative Example 9 | Comparative Example 10 | Comparative Example 11 | Comparative Example 12 |
|---|---|---|---|---|---|---|---|
| 1-1 | Si Oil 500 | 62.5 | 61.9 | 61.9 | 61.9 | 61.9 | 61.9 |
| 2 | PTFE | 37.5 | 37.1 | 37.1 | 37.1 | 37.1 | 37.1 |
| 3 | Modified Undecane Mixture | | | | | | |
| 4 | Modified Butane | | | | | | |
| 5 | Cu Phthalocyanine | | | | | | |
| 6 | Ca Sulfonate | | | | | | |
| 7 | MgO | | 1.0 | | | | |
| 8 | Ca Stearate | | | 1.0 | | | |
| 9 | AcAc Ca | | | | 1.0 | | |
| 10 | Ca SANSA | | | | | 1.0 | |
| 11 | Zn SANSA | | | | | | 1.0 |
| | Before Aging[1] | 275 | 275 | 275 | 275 | 275 | 275 |
| | After Storage at 200° C. for 168 hours[2] | — | The grease properties and appearance were lost. | The grease properties and appearance were lost. | The grease properties and appearance were lost. | The grease properties and appearance were lost. | The grease properties and appearance were lost. |
| | After Storage at 200° C. for 500 hours | cured | — | — | — | — | — |

[1] Grease consistency was measured before aging using a ½ consistency tester.
[2] Grease consistency was measured after aging using a ¼ consistency tester.

TABLE VII

Evaporation Test - Experiment 2
Composition of Application Example Greases

| Ingredient No. | Ingredient Name | App. Ex. 9 | App. Ex. 10 | App. Ex. 11 | App. Ex. 12 | App. Ex. 13 | App. Ex. 14 |
|---|---|---|---|---|---|---|---|
| 1-1 | Si Oil 300 | 60.5 | 60.5 | 60.5 | 60.5 | 60.5 | 60.5 |
| 2 | PTFE | 39.5 | 39.5 | 39.5 | 39.5 | 39.5 | 39.5 |
| 3 | Modified Undecane Mixture | 1.0 | | | | | |
| 4 | Modified Butane | | 1.0 | | | | |
| 5 | Cu Phthalocyanine | | | 1.0 | | | |
| 6 | Ca Sulfonate | | | | 1.0 | | |
| 12 | Phenol Containing Siloxane | | | | | | |
| 13 | PDMS/Zr | | | | | | |
| 14 | 1:1 Mixture of Ingredients 12 & 13 | | | | | 1.0 | |
| 15 | Ferrocene Fe | | | | | | |
| 16 | AcAc Ca | | | | | | 1.0 |
| 17 | Ca(OH)$_2$ | | | | | | |

TABLE VIII

Evaporation Test - Experiment 2
Loss Due to Evaporation (%)/Storage Time (hours)
Results for Application Examples

| Storage Time (hours) | Application Example 9 | Application Example 10 | Application Example 11 | Application Example 12 | Application Example 13 | Application Example 14 |
|---|---|---|---|---|---|---|
| 0 | 0 | 0 | 0 | 0 | 0 | 0 |
| 24 | 3.6 | 4 | 3.6 | 3.8 | 4.5 | 6.5 |
| 48 | 6.2 | 6.2 | 5.8 | 5.8 | 6.9 | 8.3 |
| 72 | 7.6 | 7.5 | 7.1 | 7 | 8.2 | 10.1 |
| 96 | 9 | 8.7 | 8.3 | 8.2 | 9.4 | 11.3 |
| 168 | 11.5 | 11.5 | 11.1 | 11.4 | 12 | 13.7 |
| 264 | 13.4 | 13.4 | 13 | 14 | 13.8 | 15.3 |

TABLE VIII-continued

Evaporation Test - Experiment 2
Loss Due to Evaporation (%)/Storage Time (hours)
Results for Application Examples

| Storage Time (hours) | Application Example 9 | Application Example 10 | Application Example 11 | Application Example 12 | Application Example 13 | Application Example 14 |
|---|---|---|---|---|---|---|
| 384 | 16 | 15.3 | 14.6 | 17 | 15.6 | — |
| 500 | 18.7 | 16.8 | 15.8 | 18.7 | 17.2 | — |

*Storage temperature: 200° C.; sample amout: 10 g
*In Application Examples 9–14, the grease properties and appearance were maintained after storage for 264 hours.

TABLE IX

Evaparatian Test - Experiment 2
Composition of Comparative Example Greases

| Ingredient No. | Ingredient Name | Comp. Ex. 13 | Comp. Ex. 14 | Comp. Ex. 15 | Comp. Ex. 16 | Comp. Ex. 17 |
|---|---|---|---|---|---|---|
| 1-1 | Si Oil 300 | 60.5 | 60.5 | 60.5 | 60.5 | 60.5 |
| 2 | PTFE | 39.5 | 39.5 | 39.5 | 39.5 | 39.5 |
| 3 | Modified Undecane Mixture | | | | | |
| 4 | Modified Butane | | | | | |
| 5 | Cu Phthalocyanine | | | | | |
| 6 | Ca Sulfonate | | | | | |
| 12 | Phenol Containing Siloxane | | 1.0 | | | |
| 13 | PDMS/Zr | | | 1.0 | | |
| 14 | 1:1 Mixture of Ingredients 12 & 13 | | | | | |
| 15 | Ferrocene Fe | | | | 1.0 | |
| 16 | AcAc Ca | | | | | |
| 17 | Ca(OH)$_2$ | | | | | 1.0 |

TABLE X

Evaporation Test - Experiment 2
Loss Due to Evaporation (%)/Storage Time (hours)
Results for Comparative Examples

| Storage Time (hours) | Comp. Ex. 13 | Comp. Ex. 14 | Comp. Ex. 15 | Comp. Ex. 16 | Comp. Ex. 17 |
|---|---|---|---|---|---|
| 0 | 0 | 0 | 0 | 0 | 0 |
| 24 | 5.6 | 5.2 | 5.2 | 8.4 | 4.2 |
| 48 | 9.4 | 7.6 | 8.3 | 12.8 | 7 |
| 72 | 11.8 | 8.9 | 10.2 | 15.5 | 8.6 |
| 96 | 13.7 | 10 | 11.8 | 17.9 | 10.4 |
| 168 | 18.1 | 12.5 | 15.6 | 24.2 | 14.3 |
| 264 | 21.7 | 14.3 | 18.1 | 28.8 | 17.3 |
| 384 | 25 | — | — | — | — |
| 500 | 27.1 | — | — | — | — |

Storage temperature: 200° C.; sample amount: 10 g

In Comparative Examples 13, 14, 15, 16 and 17, the grease properties and lost after storage for 264 hours.

TABLE XI

Aging Test - Experiment 2-2
Test Results and Composition of Application Example Greases

| Ingredient No. | Ingredient Name | Application Example 14 | Application Example 15 | Application Example 16 | Application Example 17 |
|---|---|---|---|---|---|
| 1-2 | Si Oil 300 | 61.9 | 61.9 | 59.9 | 59.9 |
| 2 | PTFE | 37.1 | | | 35.5 |
| 4 | Modified Undecane Mixture | 1.0 | 1.0 | 1.0 | 5.0 |
| 18 | PTFE Powder | | 37.1 | | |
| 18 | PTFE Powder | | | 39.1 | |
| | Before Aging[1] | 311 | 329 | 278 | 311 |
| | After Storage at 200° C. for 500 hours[2] | 243 | 243 | 235 | 225 |

[1]Grease Consistency was measured before aging using ½ consistency tester.
[2]Grease consistency was measured after aging using ¼ consistency tester.

That which is claimed:

1. A method of using a heat resistant grease composition in a fan clutch bearing of an automobile, said method comprising the step of applying the heat resistant grease composition to the fan clutch bearing, the heat resistant grease composition comprising A. a fluorosilicone oil;

B. a fluororesin thickening agent; and

C. an additive selected from the group consisting of
   i. 3,9-bis(1,1-dimethyl-2-(β-(3-t-butyl-4-hydroxy-5-methylphenyl)propionyloxyethyl)-2,4,8,10-tetraoxaspiro(5.5)undecane having the general formula

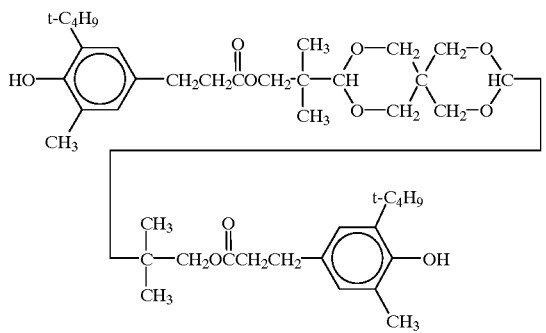

where t-C$_4$H$_9$ is a tert-butyl group;

ii. compounds having the formula

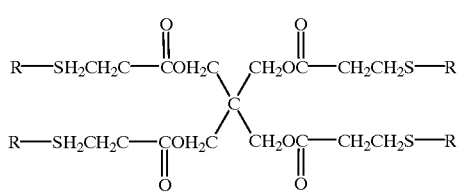

where R is an alkyl group having 12 carbon atoms;

iii. 1,1,3-tris(2-methyl-4-hydroxy-5-t-butylphenyl) butane having the formula

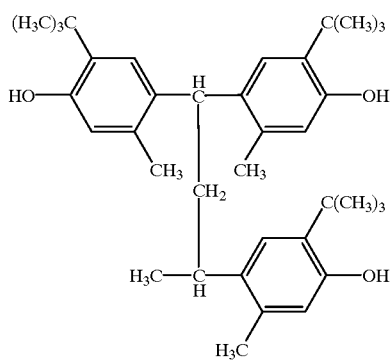

iv. copper phthalocyanine having the formula

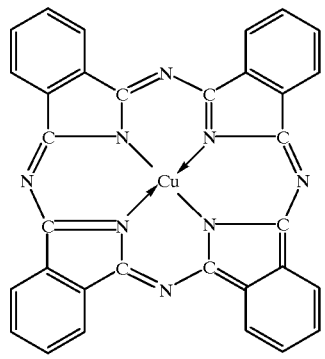

v. calcium sulfonate having the general formula

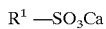

where R$^1$ is an alkyl group;

vi. copper acetylacetonate;

vii. the compound obtained by heating
      (a) 4-(phenylamino) phenoxydimethylsilyl-terminated dimethylpolysiloxane with
      (b) a mixture of polydimethylsiloxane and zirconium carboxylate in an inert atmosphere at a temperature sufficient to decompose the zirconium carboxylate, wherein the zirconium carboxylate contains 0.1 to 10 weight percent of zirconium metal; and ix. mixtures thereof.

2. The method according to claim 1, wherein the fluorosilicone oil has a viscosity (at 25° C.) of 300 to 5,000 centistokes.

3. The method according to claim 1, wherein the fluorosilicone oil has the formula

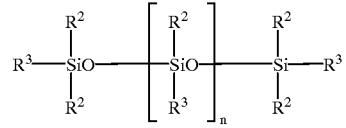

where R$^2$ is a hydrocarbon group containing 1 to 3 carbon atoms, R$^3$ is selected from the group consisting of methyl, ethyl, vinyl, phenyl and —CH$_2$CH$_2$R$^4$, where R$^4$ is a perfluoroalkyl group containing 1 to 10 carbon atoms, and n is selected such that the viscosity (at 25° C.) of the compound is in the range of 100 to 100,000 centistokes and at least 50% of the R$^3$ groups are —CH$_2$CH$_2$R$^4$ groups.

4. The method according to claim 1, wherein the fluorosilicone oil is selected from the group of compounds consisting of
   (a) Trifluoropropylmethylpolysiloxanes represented by the general formula

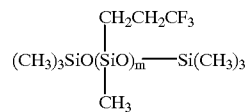

where m is selected such that the viscosity (at 25° C.) of the trifluoropropylmethylpolysiloxane is in the range of 100 to 100,000 centistokes;
   (b) Perfluoroalkylmethylpolysiloxanes represented by the general formula

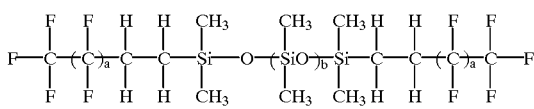

where a and b are numbers selected such that the viscosity (at 25° C.) of the perfluoroalkylmethvlnolysiloxane is in the range of 100 to 100,000 centistokes;

(c) compounds having the general formula

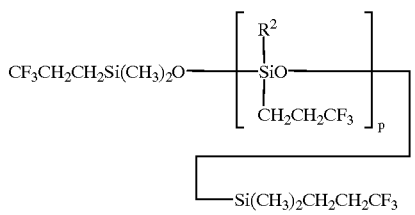

where p is a number selected such that the viscosity (at 25° C.) of the compound is in the range of 100 to 100,000 centistokes, and $R^2$ is a hydrocarbon group containing 1 to 3 carbon atoms;

(d) compounds having the general formula

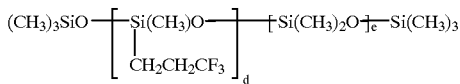

where d and e are numbers selected such that the viscosity (at 25° C.) of the compound is in the range of 100 to 100,000 centistokes;

(e) compounds having the general formula

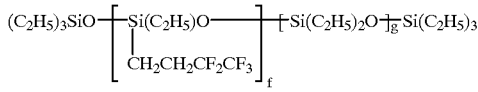

where f and g are numbers selected such that the viscosity (at 25° C.) of the compound is in the range of 100 to 100,000 centistokes;

(f) compounds having the general formula

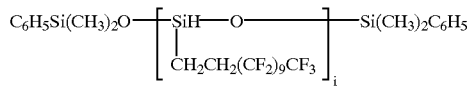

where h is a number selected such that the viscosity (at 25° C.) of the compound is in the range of 100 to 100,000 centistokes;

(g) compounds having the general formula

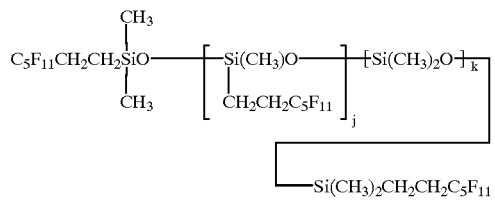

where i is a number selected such that the viscosity (at 25° C.) of the compound is in the range of 100 to 100,000 centistokes; and (h) compounds having the general formula

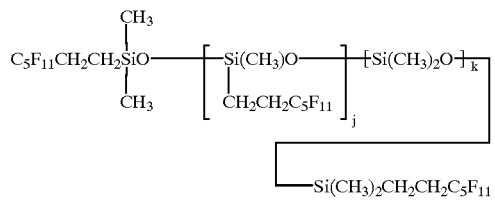

where j and k are numbers selected such that the viscosity (at 25° C.) of the compound is in the range of 100 to 100,000 centistokes.

5. The method according to claim 1, wherein the fluororesin thickening agent is selected from the group consisting of polytetrafluoroethylene and trifluoroethylene resin.

* * * * *